United States Patent
Thumm

(10) Patent No.: US 7,669,635 B2
(45) Date of Patent: Mar. 2, 2010

(54) WINDOW SHADE ARRANGEMENT WITH CONCEALED LOCKING DEVICE

(75) Inventor: Andreas Thumm, Nurtingen (DE)

(73) Assignee: BOS GmbH & Co. KG, Ostildern (DE)

( * ) Notice: Subject to any disclaimer, the term of this patent is extended or adjusted under 35 U.S.C. 154(b) by 404 days.

(21) Appl. No.: 11/292,051

(22) Filed: Dec. 1, 2005

(65) Prior Publication Data

US 2006/0118254 A1 Jun. 8, 2006

(30) Foreign Application Priority Data

Dec. 2, 2004  (DE) ................. 10 2004 058 296

(51) Int. Cl.
  *B60J 1/20* (2006.01)
(52) U.S. Cl. ................. 160/290.1; 160/276; 160/370.22
(58) Field of Classification Search ............ 160/290.1, 160/370.22, 276, 275, 289, 282, 285, 287, 160/288
See application file for complete search history.

(56) References Cited

U.S. PATENT DOCUMENTS

| 315,789 | A | * | 4/1885 | Illingworth | 160/289 |
| 529,517 | A | * | 11/1894 | Burrowes | 160/289 |
| 548,485 | A | * | 10/1895 | Walter | 160/275 |
| 729,630 | A | * | 6/1903 | Milans | 160/289 |
| 776,048 | A | * | 11/1904 | Fisher | 160/289 |
| 1,764,310 | A | * | 6/1930 | Hoyt | 160/275 |
| 1,952,689 | A | * | 3/1934 | Selje | 160/275 |
| 3,911,992 | A | * | 10/1975 | Webb | 160/290.1 |
| 5,560,668 | A | | 10/1996 | Li | |
| 5,573,050 | A | * | 11/1996 | Henkenjohann | 160/133 |
| 6,547,307 | B2 | * | 4/2003 | Schlecht et al. | 296/97.4 |
| 6,598,929 | B2 | * | 7/2003 | Schlecht et al. | 296/97.4 |
| 2004/0068839 | A1 | * | 4/2004 | Hock et al. | 16/215 |
| 2004/0104000 | A1 | * | 6/2004 | Messerschmidt et al. | 160/370.22 |
| 2007/0125506 | A1 | * | 6/2007 | Eiselt et al. | 160/370.22 |

FOREIGN PATENT DOCUMENTS

| EP | 1211110 A1 | 11/2001 |
| FR | 2792257 | 10/2000 |
| GB | 468 181 A | 6/1937 |

OTHER PUBLICATIONS

Search Report in Corresponding European Patent Application No. EP 05023237, dated Mar. 21, 2006.

* cited by examiner

*Primary Examiner*—David Purol
(74) *Attorney, Agent, or Firm*—Leydig, Voit & Mayer, Ltd.

(57) ABSTRACT

A window shade arrangement having a manually operated window shade web whose movement between open and closed positions is guided by guide rails at each side. A pull rode having oblong sliding blocks travels in the two guide rails. The sliding blocks, together with the pull rod, can swivel about an axis parallel to the pull rod. In this way, the sliding blocks can become secured in corresponding locking pockets in the guide rails. The locking can be released by manual turning of the pull rod in the opposite direction.

22 Claims, 4 Drawing Sheets

WINDOW SHADE ARRANGEMENT WITH CONCEALED LOCKING DEVICE

FIELD OF THE INVENTION

The present invention relates generally to window shades, and more particularly, to a manually operated window shade for automobiles.

BACKGROUND OF THE INVENTION

The prior art recognizes many manually operated window shade arrangements in motor vehicles, which are used to regulate the entrance of light into the vehicle interior. Such window shade arrangements are situated at the side windows or the rear window of a vehicle. In either case, such window shade arrangements in the vehicle typically include a winding shaft, which is tensioned in one direction of turning movement by means of a spring drive. A web of window shade is secured at one end to the winding shaft, and its free movable edge is connected to a pull rod. The ends of the pull rod are moveable in guide rails, which are firmly anchored in the vehicle. This is intended to prevent a rattling when the shade is extended caused by the pull rod knocking against the window.

In order to keep the shade in an extended position, a hook arrangement is commonly is used, otherwise, the shade would wind back onto the winding shaft because of its spring drive. The hook, however, is visible within the vehicle and requires manual lifting of the pull rod from the hook to release engagement between the hooked parts so that the shade can be returned to a retracted condition.

OBJECTS AND SUMMARY OF THE INVENTION

The window shade arrangement of the present invention includes guide rails for guiding movement of the pull rod of the window shade and for conveniently locking and releasing the window shade from extended positions. The web extends between the pull rod and a winding shaft, which is mounted adjacent one end of the guide rails. By means of a spring drive, the winding shaft is pretensioned in the direction of winding up movement of the window shade web. The guide rails have the advantage of preventing the pull rod from moving along a transverse axis due to vibrations of the vehicle, which would result in the pull rod knocking against the window and producing noise.

In order to secure the web of shade in an extended condition, two locking devices are provided, each of which has first and second locking abutments and at least one swivel edge. The first locking abutment can be formed, for example, on the pull rod, while the second locking abutment and the swivel edge are on the respective guide rail. With the help of the swivel edge, the pull rod can be turned at a predetermined location about an axis lying parallel to its lengthwise axis. By this turning motion of the pull rod about itself or about a nearby axis of rotation lying parallel to the pull rod, the two locking abutments can be moved into engagement. During the opposite turning movement, the engagement can be released. When the two locking abutments are engaged, the web of the shade is secured, while in the other case the web of the shade can be wound back up.

Since a rotary movement of the pull rod about an axis parallel with it results in releasing of the locking device, the locking device can easily be unlocked simultaneously at both ends of the pull rod. There is no need to unlock each locking device individually, which would be cumbersome. Since two locking devices are provided, they can easily be accommodated on the guide rail without the necessity for extending to the middle of the window as a cumbersome hook. At the same time, the unlocking process can be effected regardless of where the user grabs the pull rod and initiates the requisite turning motion. The window shade of the present invention is particularly suited for use with or in association with rear windows of motor vehicles where conventionally it is difficult to manually extend and position the pull rod to the proper location position.

The guide rails preferably define a guide groove consisting of a groove chamber and a groove slot, the width of the groove slot being less than the width of the groove chamber. In this way, an undercut groove is formed which reliably holds the respective ends of the pull rod so that the length of the pull rod can be adapted to guide rails which may converge, if desired.

The guide rails are adapted to the course of the window edge and thus lie on a common, possibly curved surface, whose axes of curvature lie parallel to each other. They can also converge toward each other, starting from the winding shaft, following the course of the window edges. The guide rails have flanks lying opposite each other, which can be formed by a respective slot wall and an adjoining wall of the groove chamber.

In order to adapt the pull rod to windows of different width, the pull rod consists of a middle piece and end pieces which can be adjusted along a lengthwise direction of the pull rod as they are guided by the guide rails. Each end piece can have a sliding block anchored via a neck piece. The dimensions of the neck piece are chosen so that they can pass through the slot of the groove, while the sliding block is adapted in its cross section and shape in the lengthwise direction to the groove chamber.

If the angle of convergence between the guide rails is not constant over the length of the guide rails, it is advantageous for the neck piece to be able to swivel relative to the end piece about an axis which runs essentially perpendicular to the axis of the relative movement between the middle piece and the end pieces of the pull rod. The sliding block advantageously has an oblong shape, in the sense that its dimensions in the direction parallel to the lengthwise dimension of the guide rail are larger than the transverse dimensions perpendicular to it. In order for the sliding block to move freely even when the guide rails are curved, it preferably has a trim, fish like shape. For reliably locking the window shade in an extended position, pretensioning or biasing means are provided to pretension the pull rod, relative to a rotary movement about an axis parallel to its lengthwise axis, into the engaging position of the locking device. This pretensioning means can result from pretensioning of the window shade web by the spring drive in the winding up direction on the rotary winding shaft.

A first locking abutment can be provided on the pull rod, and a second locking abutment and the swivel edge on the flanks of the guide rails. In this way, the guide rod has smooth contours in the area where its parts engage the guide rails with no tendency to get jammed or caught. On the other hand, space should be formed in the area of the guide rail around the second locking abutment and the swivel edge.

The first locking abutment can be formed by one end of a sliding block, which is connected to the pull rod and travels in the guide groove. The second locking abutment can be formed by the edge of a pocket, a recess, or an opening in the guide rail, or also by a corresponding wall.

The swivel edge, in turn, lying opposite the stationary locking abutment, i.e., the second locking abutment, preferably is formed by a marginal edge, a pocket, an opening, or a ridge. These structures are located at the opposite side of the guide rail so that the desired swivel motion can occur. This axis runs essentially through the slot of the guide groove. A second swivel edge can facilitate unlocking from the locked position and is therefore also advantageous.

Other objects and advantages of the invention will become apparent upon reading the following detailed description and upon reference to the drawings, in which:

Figure 1:
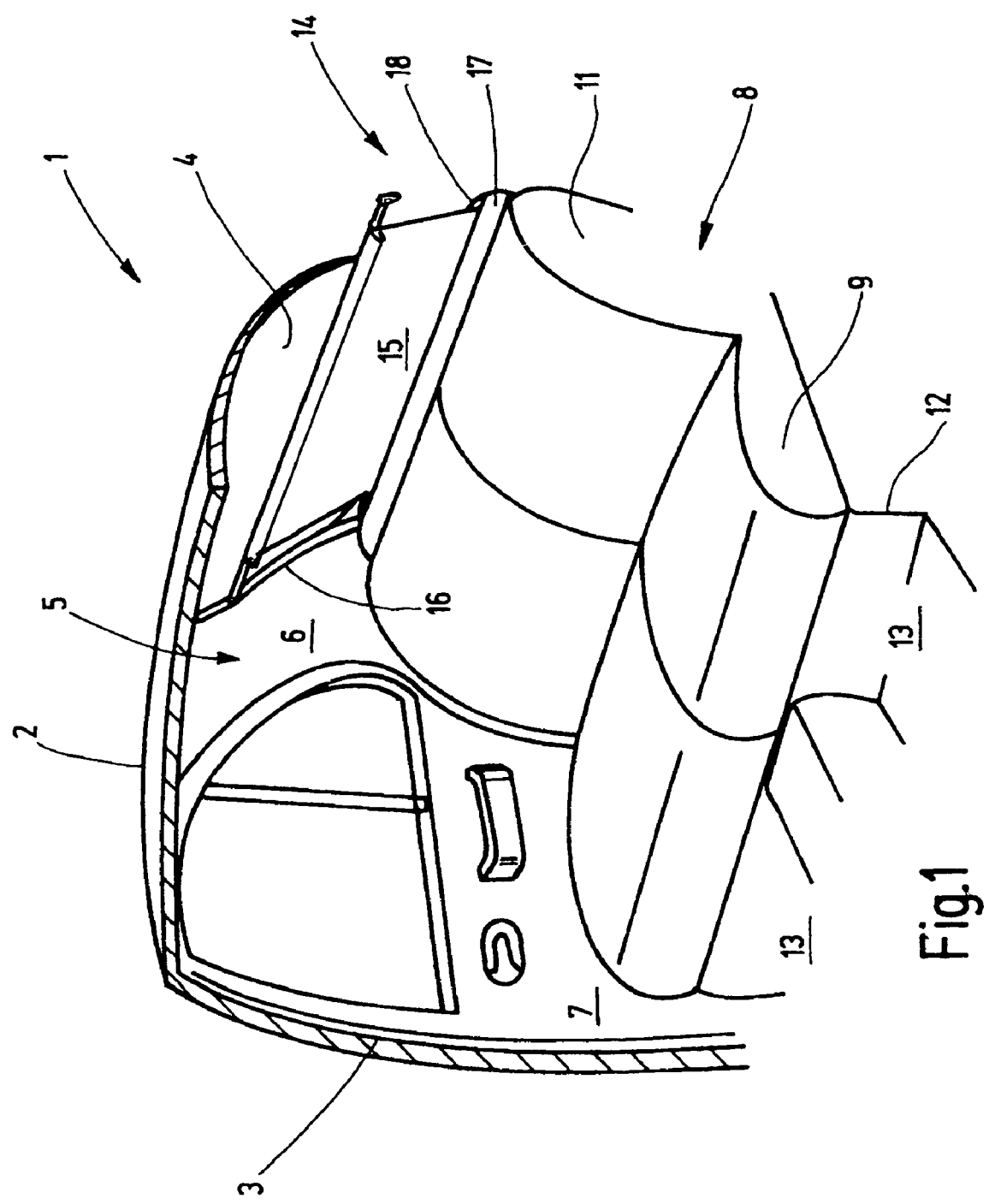
FIG. 1 is a broken open perspective of a rear area of a motor vehicle having a manually-operated rear window shade arrangement in accordance with the invention.

While the invention is susceptible of various modifications and alternative constructions, a certain illustrated embodiment thereof has been shown in the drawings and will be described below in detail. It should be understood, however, that there is no intention to limit the invention to the specific form disclosed, but on the contrary, the intention is to cover all modifications, alternative constructions and equivalents falling within the spirit and scope of the invention.

DETAILED DESCRIPTION OF THE PREFERRED EMBODIGMENT

Referring now more particularly to FIG. 1 of the drawings, there is shown an illustrated motor vehicle having a rear window shade arrangement in accordance with the invention. The illustrated motor vehicle has a body segment 1 that includes a roof 2 from which a B-column 3 extends downwardly at the side to a floor assembly. A corresponding B-column would be at the broken-away side of the vehicle. The roof 2 extends to a rear window 4 at its back edge. At the side, the rear window 4 terminates in a C-column 5, which is situated at a distance from the B-column 3 and has an interior paneling 6. A rear right-side door 7 is hinged in usual fashion to the B-column 3 between the B-column 3 and the C-column 5. At the height of the rear right-side door 7, there is a rear seat 8 having a seat surface 9 and a back rest 11. The rear seat surface 9 lies on a pedestal 12, which is part of the floor assembly, and foot spaces 13 are formed in front of the rear seat surface 9.

In front of the rear window adjacent an innerside, a window shade arrangment 14 is provided which includes a window shade web 15, which is shown in FIG. 1 in partially extended condition. Guiderails 16 are provided on opposite sides of the web 15, starting at a hat rest 17 located behind the backrest 11 and extending along side each window edge. The hat rest 17 is formed with an exit slot 18 from which the window shade web can be extracted.

Figure 2:
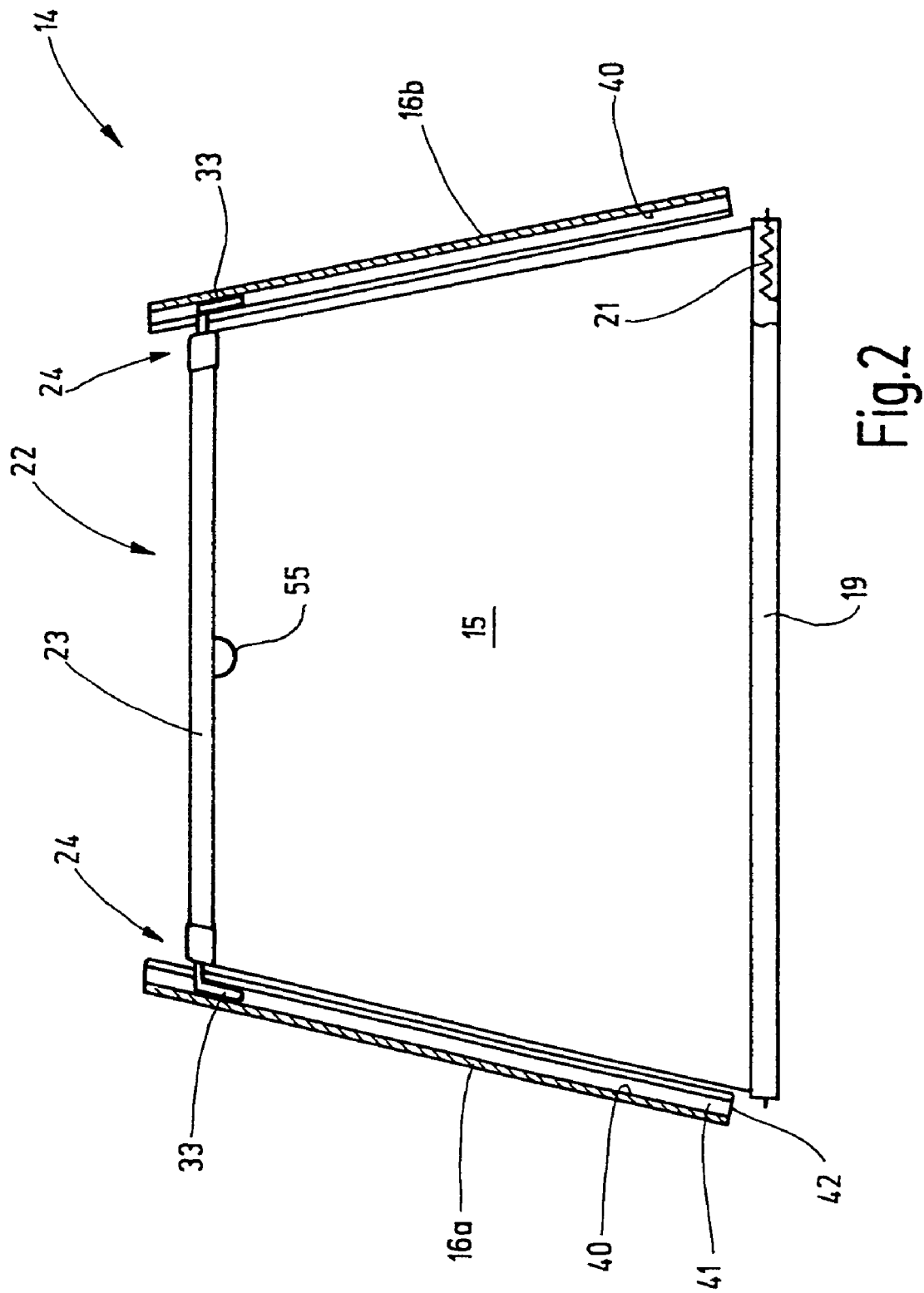
FIG. 2 is a schematic depiction of the rear window shade of the present invention, shown in an extended position.

The guide rails 16 of the window shade 14, designating 16a, 16b in FIG. 2, follow the course of the innerside of the rear window 4, i.e., lying on the common surface which is curved parallel to the rear window pane and they converge in the direction of their upper end. The guide rails 16, 16b preferably are integrated in the interior side paneling 6 of the two C-columns 5 and extend upwardly starting at the height of the slot 18 in the hat rest 17. Beneath the hat rest 17, a winding shaft 19 is rotably mounted in the car body. The winding shaft 19 is pretensioned in the winding up direction of the window shade web by means of a spring drive 21, for example, in the form of a helical spring. In this case, the helical spring 21 is anchored at one end, as schematically illustrated, in the tubular winding shaft 19. Its other end is secured in the vehicle body adjacent an end of the winding shaft 19.

The window shade web 15 consists of a flexible material such as a thin perforated plastic film or a knitted fabric. It is cut in approximately trapezoidal shape and chosen so that in the extended state it shades the rear window 4 as much as possible. At one edge, the web 15 is fastened to the winding shaft 19. Its other end away from the winding shaft 19 is secured to a pull rod 22, which lies in parallel with the winding shaft 19 in all operating positions.

The pull rod 22 comprises a middle piece 23 and two end pieces 24 which can move relative to the middle piece. The end pieces 24 in this instance can shift telescopically in their lengthwise direction relative to the middle piece in order to follow the converging course between the two guide rods 16a and 16b.

Figure 3:
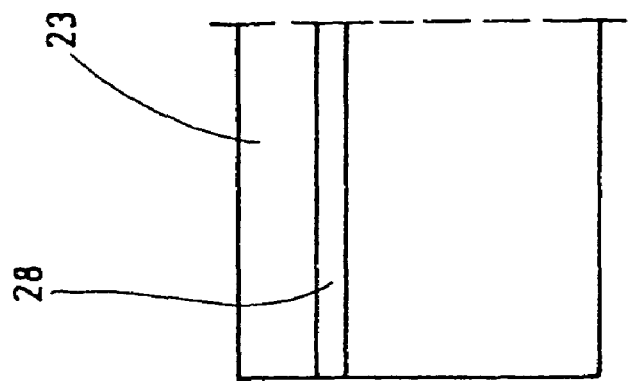
FIG. 3 is an enlarged exploded view of one end of the pull rod of the illustrated window shade.
Figure 3:
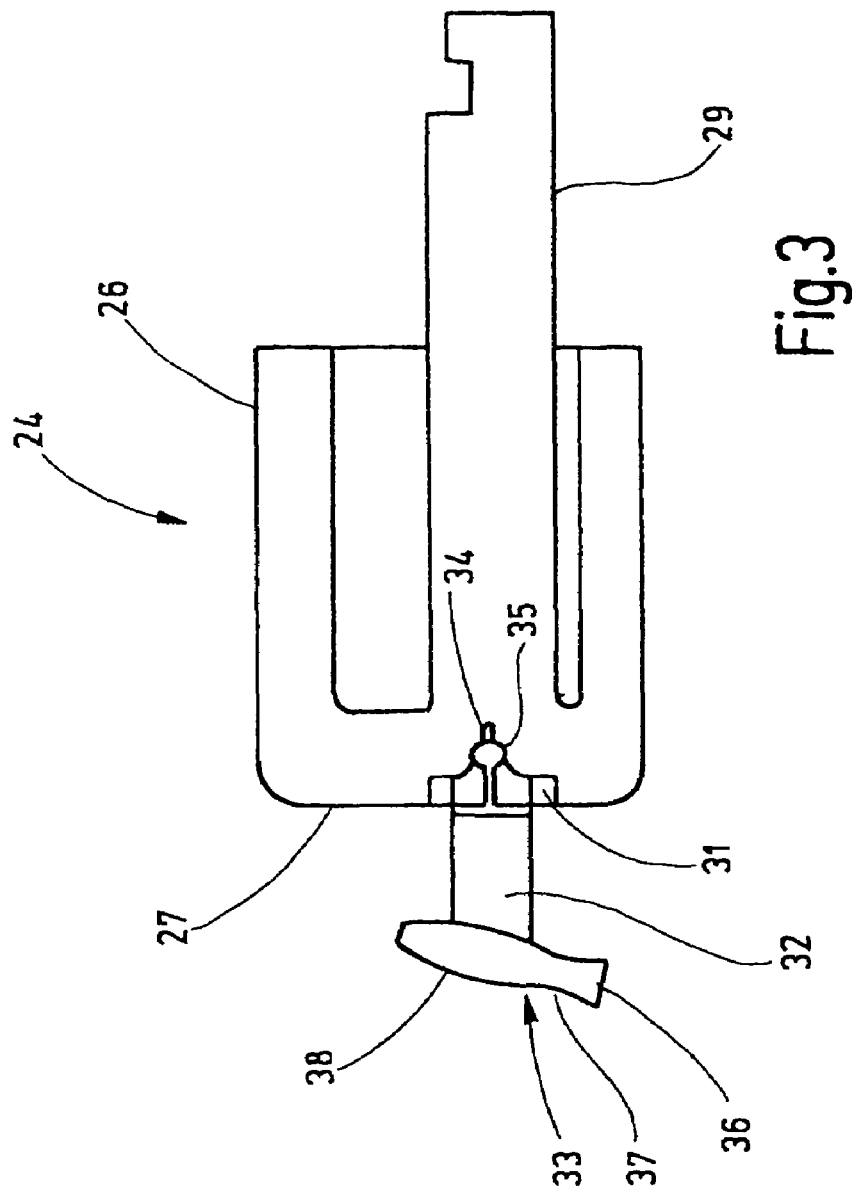

As can be seen from FIG. 3, the end pieces 24 are somewhat cup shaped and open at the bottom in the direction of the hat rest. They form a collar 26 with a side wall 27 facing the direction of the guide rails 16a and 16b. In the resulting structure, the middle piece 23 can shift lengthwise inside the collar 26.

The middle piece 23 is provided with a downward pointing weatherstripping groove 28 its bottom side in which the free end of the shade web 15 is installed. Since the end piece 24 is open toward the bottom with its collar 26 and this opening is designed such that the collar 26 does not collide or interfere with the edges of the shade web 15 located in the weatherstripping groove 28. A rod 29 projects from the wall 27, extending into the inside of the tubular middle piece 23 to ensure a smooth sliding fit of the end piece 24 relative to the middle piece 23.

In the side wall 27, a pocket 31 is formed coaxially with and as an extension of the rod 29, opening in a direction away from the rod 29 and the middle piece 23. The pocket 31 serves to receive and support a neck piece 32 having a free end that carries a relatively-rotationably sliding block 33. The neck piece 32 and the sliding block 33 in this case are molded as a single piece.

The neck piece 32 preferably has a rectangular cross section and is substantially thinner in the direction perpendicular to the plane of the drawing than the side of the surface which can be seen. The height of the pocket 31, which is roughly rectangular in cross section, is adapted to the shape of the neck piece 32.

Figure 4:
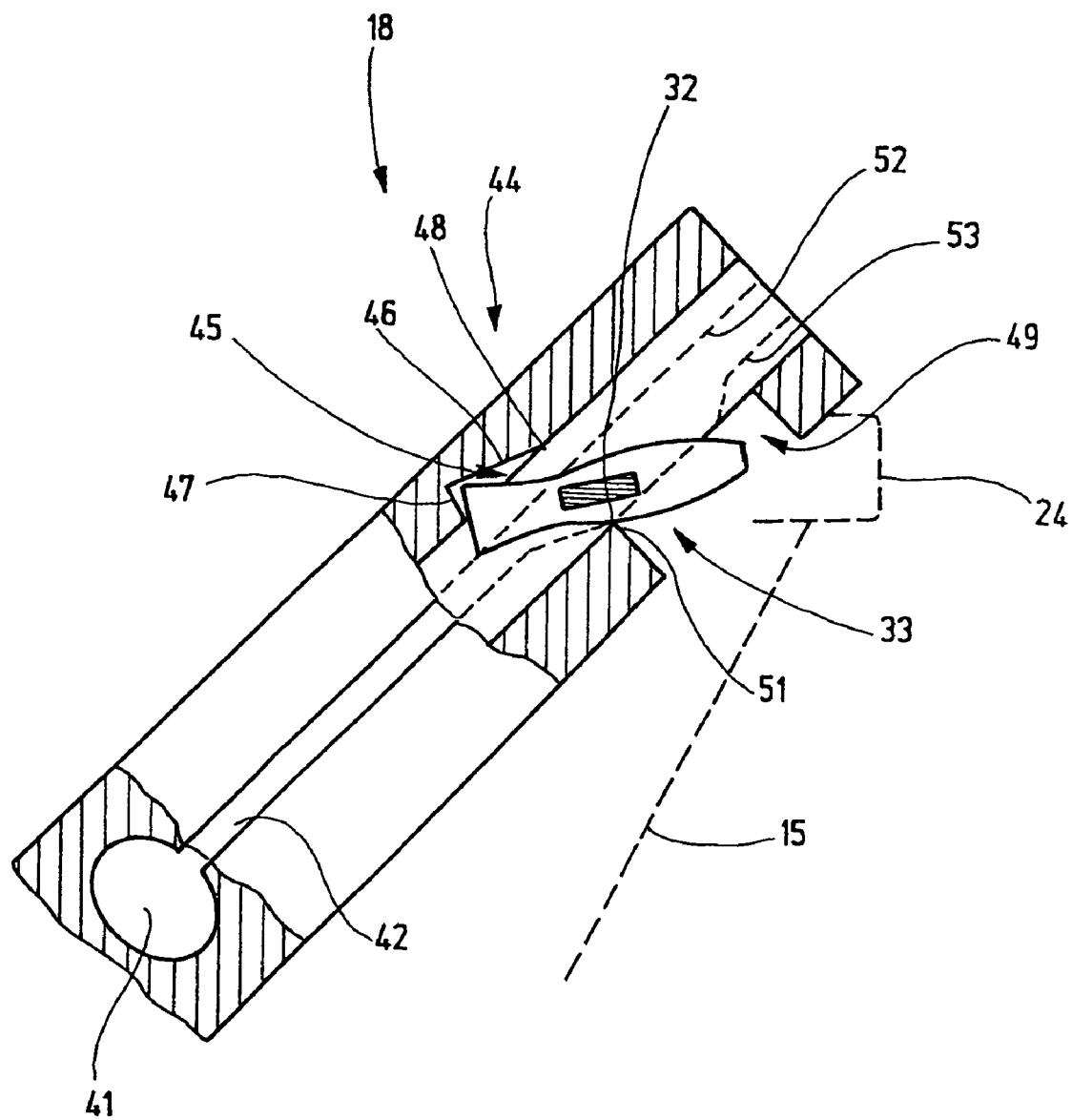
FIG. 4 is an enlarged fragmentary section depicting the interaction between the guide rail and locking block of the window shade pull rod in a locked position.

The neck piece 32 can swivel in the pocket 31 about an axis perpendicular to the plane of the drawing in FIG. 4. For this purpose, a pin 34 is molded on the neck piece 32 which locks inside a corresponding recess 35 in the wall of the pocket 31. The recess 35 has a partly cylindrical shape and is open in the same direction as the pocket 31 so that the neck piece 32 can be pushed in with the pin 34 locked in the recess 35 for relative pivotable movement.

The illustrated sliding block 33 has a somewhat fish-shaped appearance in side view with a flat abutment surface 36 at the rear, a tapered segment 37 adjacent the abutment surface 36, and a front segment 38 resembling a rounded cone. The sliding block 33 is symmetrical and the front segment 38 at its greatest width is precisely the same width as the rear abutment surface 36. This abutment surface 36 is planar and lies perpendicular to the lengthwise axis of the sliding block 33.

The guide rails 16a, 16b each have a guide groove 40 which is shaped in conformity with the sliding block 33 and its neck piece 32. For this purpose, each guide groove 40 consists of a groove chamber 41 with a circular cross section and a groove slot 42. The diameter of the groove chamber 41 is slightly larger than the largest diameter of the sliding block 33 and the width of the slot 42 is somewhat greater than the thickness of the neck piece 32.

FIG. 4 shows in an enlarged, schematic representation of one of the guide rails 16, showing the circular groove chamber 41 and the groove slot 42 emerging from it. As will be understood, the groove slots 42 of the two guide rails 16a, 16b are oriented toward each other.

In an upper region, i.e., away from the winding shaft 19, each of the guide rails 16a 16b contains a part of a locking device 44. Depending on the installation position of the guide rails 16 in the motor vehicle, the left boundary line of the groove chamber 41 corresponds to the upper side or the upper region of the groove chamber 41, while the opposite side represents the bottom side. In the upper wall extending from the groove chamber 41, a pocket 45 is formed, having the shape of a conical segment. This is bounded by a side wall 46 in the shape of a conical segment and a surface 47 making an angle with it. The surface 47 is a flat surface and it runs at an angle, which deviates by only a few degrees from the perpendicular, to the lengthwise axis of the groove chamber 41. The surface 47, as will become apparent, acts as a first abutment surface. The wall 46 at its end away from the abutment surface 47 passes via a parabolic curved edge 48 into the wall of the groove chamber 41. The part furthest away from the abutment surface 47 forms a swivel edge, as also will become apparent.

The groove chamber 41 contains at its lower side a roughly rectangular opening 49, with a swivel edge 51, lying at about the height of the parabolic curved edge 48 relative to the distance from the winding shaft. The length of the rectangular opening 49 is dimensioned to accommodate the front segment 38 of the sliding block 33. The rest of the opening 49 is further from the winding shaft than the pocket 45. In the region of the opening 49, the slot 42 is slightly enlarged. The upper margin 52 continues uninterrupted, while the lower margin 53 is slightly displaced downward, as shown by the broken line.

It will be seen that the illustrated locking arrangement functions in the following manner:

In the resting state, the web 15 is fully wound up on the winding shaft 19. In this position, the pull rod 22 lies at the exit slot 18 of the hat rest 17. The sliding blocks 33 are still inside the guide grooves 40. Their outer end, i.e., the segment 38, extends away from the winding shaft 19.

Because of the displaced anchoring of the shade web 15 on the pull rod 22, the shade web 15 is pretensioned by the spring drive 21 and produces a slight tilting moment of the pull rod about an axis lying parallel to the lengthwise axis of the pull rod 22 and extending approximately through a region of the neck piece 32. The connection of the shade web 15 to the pull rod 22, as indicated in FIG. 4, in relation to the end piece 24, causes the shade web 15 to extend more within the interior of the vehicle than the guide rail 16. The guide rail 16, in other words, extends between the shade web 15 and the rear window 4.

In order to manually extend the shade 14, a handle 55 in this case in the form of a strap is provided roughly at the middle of the pull rod 22 on the middle piece 23. The user can grab this handle 55 by his fingers and thus move the pull rod 22 along the two guide rails 16a, 16b away from the winding shaft 19.

When the user has moved the pull rod 22 a sufficient distance away, the abutment surface 36, i.e., the rear or lower surface of the sliding block 33, will pass the abutment surface 47. Because of the pretensioning by the shade web 15 and the force exerted by hand, the two sliding blocks 33 can perform a short turning or tilting movement about the swivel edge 51. During the swivel movement, as shown by FIG. 4, the front segment 38 drops into the recess 49, while the rear part of the sliding block with the abutment surface 36 goes into the pocket 45.

Once this position is attained, the user can release the handle 55. The pretensioned shade web 15 will tend to further swing the sliding blocks 33 about the swivel edge 51 so that the rear abutment surface 36 remains engaged with the abutment surface 47 or the corresponding boundary edge. This accomplishes a locking of the window shade and the spring drive 21 is prevented from winding the shade web 15 back onto the winding shaft 19. The mentioned locking occurs nearly simultaneously at both ends of the pull rod 22. For this purpose, of course, the pockets 45 and the opening 49 in both guide rails 16a, 16b re similarly located relative to the distance from the winding shaft 19.

When the user wishes to retract the manually extended shade 14 once again, he again grasps the strap 55, but this time so that the turning moment produced by the shade web 15 is nullified and thus the two sliding blocks 33 are again placed in a position in which the lengthwise axis of the sliding block 33 again coincides with the lengthwise axis of the groove chamber 41 at that location. This back swiveling can be facilitated by the sliding block coming to bear against the swivel edge 51 and thus at a distance from the abutment surface 47. This abolishes the unlocking between the abutment surface 47 and the abutment surface 36 on the sliding block 33 and the user can move the pull rod 22 toward the winding shaft 19, while at the same time the shade web 15 is being up on the winding shaft 19. As can be seen in FIG. 4, room must be created for the swiveling of the neck piece 32 in the region of the slot 42, where the locking and the tiling movement occur, and therefore the lower margin 53 is set back there, as shown.

Moreover, it can be seen that the locking can occur not only in the region of the upper end of the two guide rails 16a, 16b, but also for example, in a middle region. For this purpose, the arrangement of the pocket 45 and the opening 49 be provided at a suitable location along the length of the guide rails 16a, 16b between the winding shaft 19 and with the resting position below the fully extended position.

From the foregoing, it can be seen that the window shade arrangement of the present invention is particularly adapted for manual operation in automobiles, and particularly rear windows of automobiles. The window shade arrangement includes a pair of guiderails on opposite sides of the window shade web within which a pull rod is moveable. The pull rod has oblong sliding blocks, that together with the pull rod, swivel about an axis parallel to the pull rod. In this way, the sliding blocks are adaptable for engaging corresponding locking pockets in the guide rails to lock the window shade in an extended position and can be released by manually rotating the pull rod in an opposite direction which permits return movement under the guidance of a spring drive of the windup shaft.

The invention claimed is:

1. A window shade arrangement (14) for motor vehicles comprising:
   a rotatably mounted window shade shaft (19),
   a drive (21) for turning the shaft in one direction of turning movement,
   a window shade web (15) having one edge fastened to the window shade shaft (19) and an opposite edge that is selectively moveable from the window shade shaft (19), a pull rod (22) connected to said moveable window shade web edge, a pair of guide rails (16) disposed in spaced-apart relation to each other for guiding movement of said pull rod (22) with said window shade web (15), a locking device (36,47,48,51) for temporarily locking said pull rod at an extended position away from said winding shaft (19), said locking device including an elongated locking element (33) fixed to an end of said pull rod for movement with said pull rod in one of said guide rails, said locking element (33) having opposed elongated side surfaces and an abutment surface (36) at an end of said side surfaces, said one guide rail having a fixed locking abutment surface (47) disposed at a predetermined location along the guide rail transverse to the direction of movement of said locking element in the guide rail, said one guide rail having a fixed swivel edge (51) at a predetermined location along the guide rail arranged opposite said guide rail abutment surface (47) and transverse to the direction of movement of said locking element in said one guide rail, and said locking element (33) being movable with said pull rod (22) to a position adjacent said swivel edge (51) and as an incident to swivel movement of the pull rod (22) about the longitudinal axis of said pull rod one of said side surfaces of said elongated locking element is engageable with said fixed swivel edge for swivel movement about said fixed swivel edge (51) for enabling movement of said locking element abutment surface (36) into locking engagement with said oppositely located fixed abutment surface (47) for retaining the pull rod (22) in a locked position, and wherein said locking element abutment surface (36) is movable into engaging relation with said fixed abutment surface (47) in response to swivel movement of said one locking element side surface in one direction about side swivel edge (51), and said locking element abutment surface (36) being releasable from engaging relation with said fixed abutment surface (47) in response to swivel movement of said one locking element side surface about said swivel edge in an opposite direction.

2. The window shade arrangement of claim 1 in which each said guide rail (16) has two guide flanks extending in parallel spaced apart relation to each other, said guide rails (16) each have a guide groove (40) defined by a groove chamber (41) and a groove slot (42), said groove slot having a width less than the width of said groove chamber (41) for creating an undercut, one flank of each guide rail being formed by one wall of the slot (42) and a portion of a wall of the groove chamber (41) and the other guide flank of each guide rail being formed by an opposite wall of the slot and an adjoining region portion of the wall of the groove chamber (41).

3. The window shade arrangement of claim 1 in which said guide rails (16) converge toward each other, starting from the winding shaft and extending in the direction of their ends away from the winding shaft.

4. The window shade arrangement of claim 1 in which said pull rod (22) is comprised of a middle piece (23) connected to the window shade web (15) and two end pieces (24) that are adjustable relative to the middle piece (23) in a lengthwise direction of the pull rod, and said end pieces (24) are guided in the guide rails (16).

5. The window shade arrangement of claim 4 in which each guide rail (16) has a guide groove (40) defined by a groove chamber (41) and a groove slot (42), each end piece (24) having a sliding block (33) secured thereto via a neck piece (32), said neck piece (32) being sized to fit through the slot in said groove (40), and said sliding block (33) having an elongated shape for movement in said groove chamber (41), and at least one of said sliding blocks (33) form said locking element.

6. The window shade arrangement of claim 5 in which said sliding block (33) and neck piece (32) are adapted for swivel movement relative to a pull rod end (25) about an axis extending perpendicular to the direction of relative movement between the middle end piece (24) and middle piece (23).

7. The window shade arrangement of claim 1 in which said locking element (33) has an oblong shape with a dimension parallel to the guide rail (16) being greater than a transverse dimension of the sliding block.

8. The window shade arrangement of claim 1 in which said locking element (33) has a reduced diameter region (37) between its opposite ends (38, 36).

9. The window shade arrangement of claim 1 in which said locking element (33) has a fishlike shape viewed from the side defined by curved elongated sides, a substantially flat tail end that defines said locking element abutment surface, and a reduced diameter region between the curved elongated sides and tail end.

10. A window shade arrangement of claim 1 in which said pull rod is rotatably biased in a direction that maintains said locking device (36, 47, 48, 51) in engaged relation to each other.

11. A window shade arrangement of claim 10 in which said pull rod is rotatably biased by said drive (21).

12. A window shade arrangement of claim 11 in which said drive is a spring operably connected to the drive shaft.

13. The window shade arrangement per claim 10 in which said drive tensions the pull rod by reason of tensioning of the window shade web which is fastened to the pull rod at a radial distance from an axis defined by the swivel edges (51) of the locking devices.

14. The window shade arrangement of claim 1 in which said fixed abutment surface (47) is formed by a surface (47) of a first recess (45) in the guide rail (16).

15. The window shade arrangement of claim 14 in which said fixed abutment surface (47) is formed by an opening that extends through the guide rail.

16. The window shade arrangement of claim 1 in which said swivel edge (51) is formed by a recess in the guide rail (16).

17. The window shade arrangement of claim 14 in which said second recess is an opening (49) extending through the guide rail.

18. The window shade arrangement of claim 1 in which said fixed abutment surface is formed in said guide rail.

19. The window shade arrangement of claim 1 in which one of said locking devices is provided at each end of said pull rod.

20. The window shade arrangement of claim 1 in which said guide rails are vertically oriented, and said locking element moves vertically within said one guide rail.

21. A window shade arrangement (14) for motor vehicles comprising:

a rotatably mounted window shade shaft (19), a window shade web (15) having one edge fastened to the window shade shaft (19) and an opposite edge that is selectively moveable from the window shade shaft (19), a pull rod (22) connected to said moveable window shade web edge, a pair of guide rails (16) disposed in spaced-apart relation to each other for guiding movement of said pull rod (22) with said window shade web (15) between extended and retracted positions, a spring drive operatively connected to said drive shaft for rotating said drive shaft in a direction for winding up said window shade web upon return to a retracted position;

a locking device (36,47,48,51) for temporarily locking said pull rod at an extended position away from said winding shaft (19), said locking device including an elongated locking element (33) fixed to an end of said pull rod for movement with said pull rod in one of said guide rails, said locking element (33) having opposed elongated side surfaces and an abutment surface (36) at an end of said side surfaces, said one guide rail having a fixed locking abutment surface (47) disposed at a predetermined location along the guide rail transverse to the direction of movement of said locking element in the guide rail, said one guide rail having a fixed swivel edge (51) at a predetermined location along the guide rail arranged opposite said guide rail abutment surface (47) and transverse to the direction of movement of said locking element in the one guide rail, said locking element (33) being movable with said pull rod (22) to a position adjacent said swivel edge (51), said window shade web being connected to said pull rod such that a tilting torque is exerted on the pull rod by said spring drive about a long axis of the pull rod so that upon positioning of said locking element abutment surface (36) adjacent said fixed abutment surface (47) one of said side surfaces of said elongated locking element is moved into engagement with said fixed swivel edge (51) for swivel movement about said fixed swivel edge (51) for enabling movement of said locking element abutment surface (36) into locking engagement with said oppositely located fixed abutment surface (47) for retaining the pull rod (22) in a locked position, and said locking element abutment surface (36) being releasable from engaging relation with said fixed abutment surface (47) in response to swivel movement of said one locking element side surface about said swivel edge in an opposite direction.

22. A window shade arrangement (14) for motor vehicles comprising:

a rotatably mounted window shade shaft (19), a drive (21) for turning the shaft in one direction of turning movement, a window shade web (15) having one edge fastened to the window shade shaft (19) and an opposite edge that is selectively moveable from the window shade shaft (19), a pull rod (22) connected to said moveable window shade webbed edge, a pair of guide rails (16) disposed in spaced-apart relation to each other for guiding movement of said pull rod (22) with said window shade web (15), a locking device (36,47,48,51) for temporarily locking said pull rod at an extended position away from said winding shaft (19), said locking device including an elongated locking element (33) fixed to an end of said pull rod for movement with said pull rod in one of said guide rails, said locking element (33) having opposed elongated side surfaces and a flat abutment surface (36) at an end of said side surfaces in perpendicular relation to a long axis of said locking element, said one guide rail being formed with a first recess disposed at a predetermined location along one of said one guide rail edge (47) that defines a fixed locking abutment in transverse relation to the line of said movement of said elongated locking element in the guide rail, said one guide rail being formed with a second recess that defines a fixed swivel edge (51) at a predetermined location along said one guide rail arranged opposite said guide rail abutment surface (47) and transverse to the direction of movement of said locking element in the guide rail, and said locking element (33) being movable with said pull rod (22) to a position adjacent said swivel edge (51) and as an incident to swivel movement of the pull rod (22) about the longitudinal axis of said pull rod one of said side surfaces of said elongated locking element is engageable with said fixed swivel edge 51 for swivel movement about said fixed swivel edge (51) for enabling movement of said locking element abutment surface (36) into locking engagement with said oppositely located fixed abutment surface (47) for retaining the pull rod (22) in a locked position, and wherein said locking element abutment surface (36) is movable into engaging relation with said fixed abutment surface (47) in response to swivel movement of said one locking element side surface in one direction about side swivel edge (51), and said locking element abutment surface (36) being releasable from engaging relation with said fixed abutment surface (47) in response to swivel movement of said one locking element side surface about said swivel edge in an opposite direction.

* * * * *